June 8, 1943.  C. G. PREIS  2,321,042
CONTAINER
Filed July 19, 1941  2 Sheets-Sheet 1
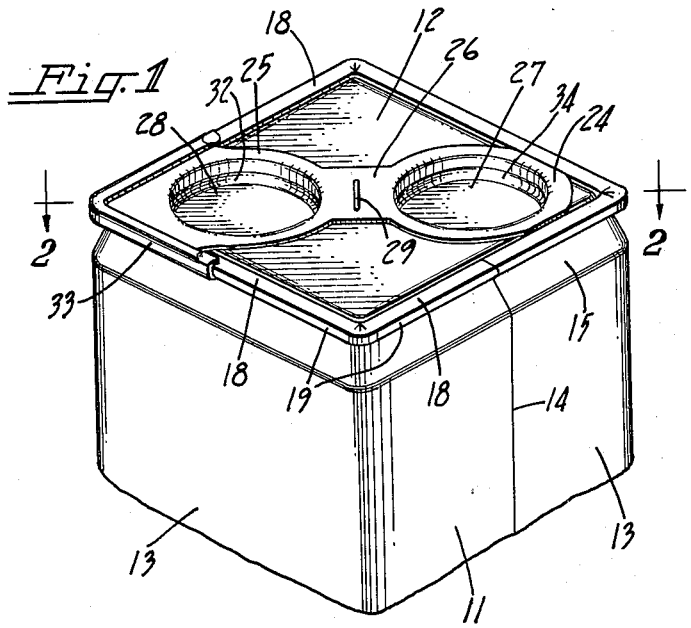
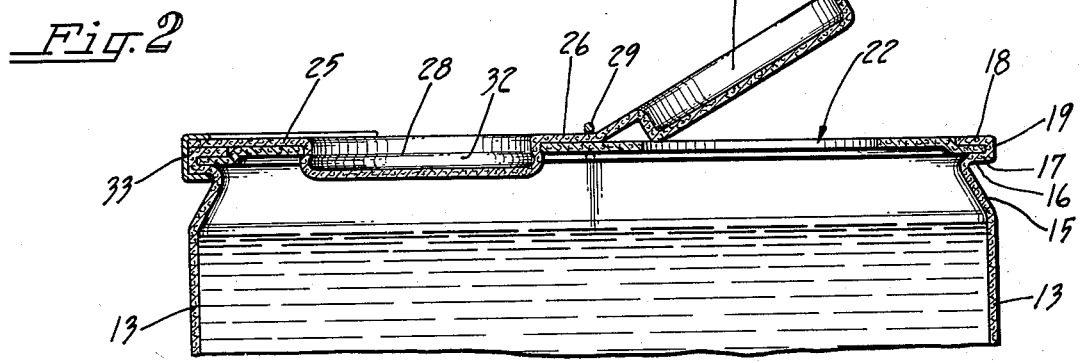
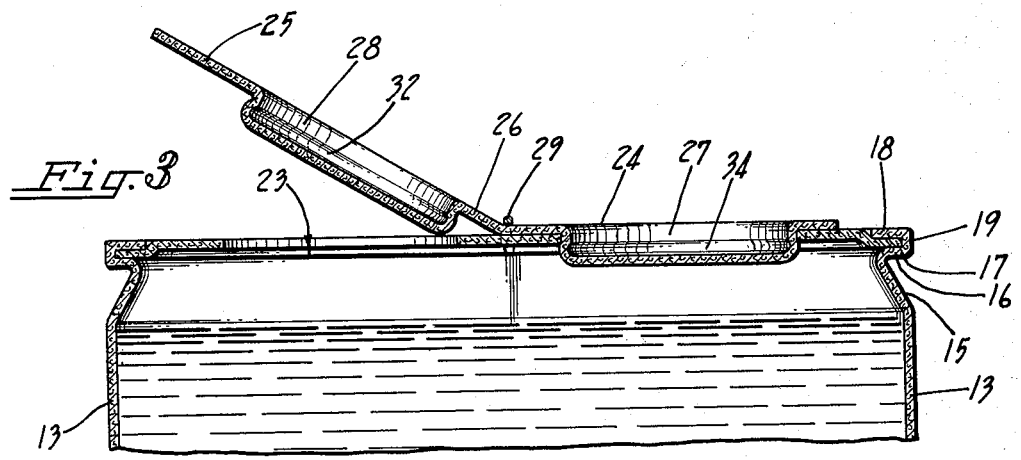
INVENTOR
Carl G. Preis
BY Ivan D. Thornburgh
Chas. H. Erne
ATTORNEYS June 8, 1943.  C. G. PREIS  2,321,042
CONTAINER
Filed July 19, 1941  2 Sheets-Sheet 2
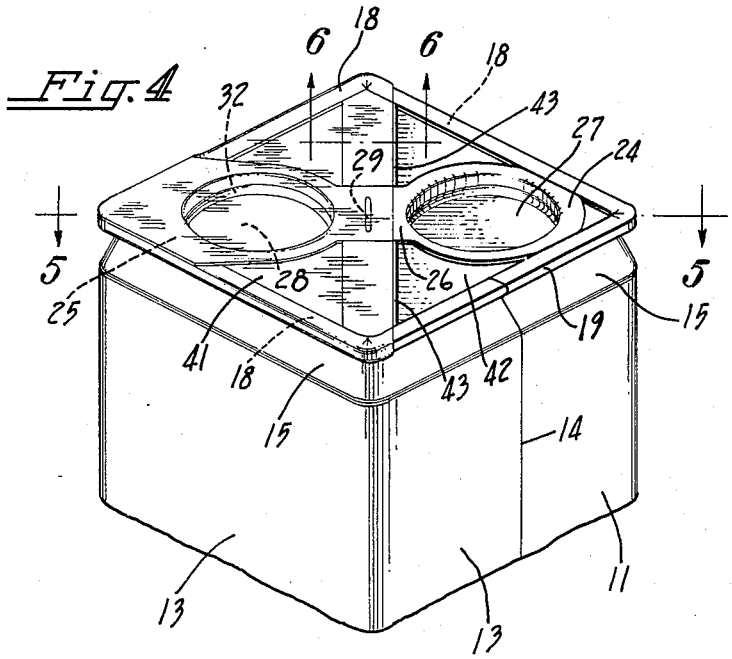
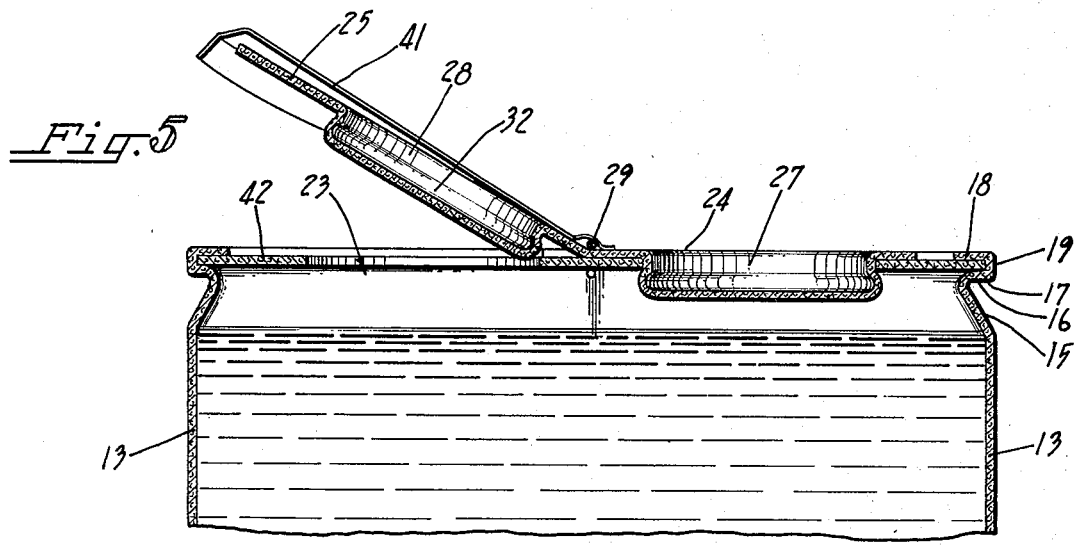
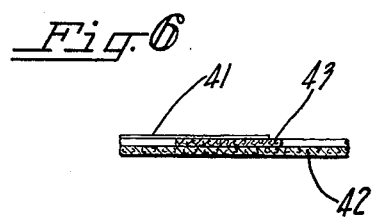
INVENTOR
Carl G. Preis
BY Ivan D. Thornburgh
Chas. H. Erne
ATTORNEYS Patented June 8, 1943

2,321,042

UNITED STATES PATENT OFFICE 2,321,042

CONTAINER

Carl G. Preis, Forest Hills, N. Y., assignor to American Can Company, New York, N. Y., a corporation of New Jersey Application July 19, 1941, Serial No. 403,212

3 Claims. (Cl. 229—7)

This invention relates to fibre containers for the packaging and delivery of liquids, such as milk, fruit juices or the like and has particular reference to a container top having separate filling and dispensing openings each closed and sealed by its respective hinged plug closure.

In certain respects, the invention constitutes an improvement upon the container illustrated and described in the John M. Hothersall United States Patent 2,085,979, issued July 6, 1937, and is especially an improvement which embodies a double opening in the container wall for filling and dispensing.

The invention contemplates a liquid-proof container which comprises a tubular body substantially square through its transverse section, having flat top and bottom end members secured to the body by interfolded marginal portions constituting end seam joints in which the parts are permanently united by a suitable liquid-proof adhesive interposed in the end seams to produce a leak-proof container, the top end having a filling opening at one corner and a dispensing opening at an oppositely disposed corner, both openings being closed and sealed by their respective hinge plug closures.

An object of the invention is the provision of a sanitary fibre container for liquids such as milk and the like, wherein the top end has separate filling and dispensing openings which are closed and sealed independently, the dispensing opening being closed at the time of manufacture so that it will remain sealed and in sterile condition until it is initially opened by an ultimate consumer.

Another object of the invention is the provision in a container of the character described having separate filling and dispensing openings in the top end, which are provided with hinge plug closures for closing and sealing the openings, the dispensing opening being hermetically sealed at the container manufacturer's plant and made tamper-proof by the application of a U-shaped metal band which embraces the marginal flange of a plug closure and an end seam part of the container while the filling opening is sealed at the dairy following the filling of such a container.

Another object of the invention is the provision of such a container having separate filling and dispensing openings in the top end, wherein the dispensing opening is closed and sealed at the time the container is made and thereafter is covered while in a sterile condition by an overcap or shield which protects the dispensing plug closure and a portion of the top end surrounding the dispensing opening, thus maintaining the protected parts free from contamination and until the container is opened by a consumer.

Numerous other objects and advantages of the invention will be apparent as it is better understood from the following description, which, taken in connection with the accompanying drawings, discloses a preferred embodiment thereof.

Referring to the drawings:

Figure 1 is a fragmentary perspective view of a sealed container embodying the present invention and illustrating a top end member having a filling opening and a dispensing opening disposed at opposite corners of the container, which openings are closed and sealed by separate hinge plug closures;

Fig. 2 is an enlarged fragmentary view in section of the container shown in Fig. 1 illustrating a hinge plug closure prior to being inserted into the filling opening of a filled container, the view being taken substantially along the line 2—2 of that figure;

Fig. 3 is a view similar to Fig. 2 but showing the filled container ready for pouring with the hinge plug closure lifted into raised position and uncovering the dispensing opening;

Fig. 4 is a view similar to Fig. 1 showing an alternate form of the invention having an overcap or protective cover sealed over a major portion of the top end including the hinge plug closure which closes the dispensing opening;

Fig. 5 is an enlarged fragmentary sectional view of the container shown in Fig. 4 as taken substantially along the line 5—5 in that figure and illustrating such a container open and having the overcap and hinge plug closure lifted into an opened position; and Fig. 6 is a fragmentary enlarged sectional view taken substantially along the line 6—6 in Fig. 4 showing the overcap positioned upon a flush top part of the container.

The containers illustrated in different views of the drawings are of the general construction described in detail in the Hothersall patent hereinbefore mentioned. Such a container briefly comprises a substantially rectangular fibre body 11 closed at its ends with suitable top and bottom end closure members. For the purpose of the present invention only the top end closure member is illustrated and is designated by the numeral 12.

The container body 11 preferably is formed from a single sheet of liquid-proof fibrous material folded at right angles in four different places to provide four side walls 13. The edges of such a sheet are joined along one of the side walls in a vertical lap side seam 14 (Fig. 1). The lapped parts of the side seam joint are secured together by suitable adhesive and this joint as well as the entire container is made liquid-proof as by a paraffin treatment.

The end members are substantially square and of similar construction, preferably formed from the same fibrous material as the body of the container. Figure 2 of the drawings shows in detail how the top closure member 12 is interlocked with the adjacent end or marginal edge portion of the body. For this purpose the body marginal end parts are bent inwardly as at 15 and then outwardly as at 16 thereby providing a shoulder or ledge 17 which extends circumferentially of the body and upon which the top end closure is supported.

The top end member 12 may be panelled or offset adjacent its marginal edges so that the top surface of the end closure is substantially flush with the outer extreme edges of the body marginal portion when completed in an end seam joint. For this purpose the extreme edges of the body are further bent upwardly and then inwardly over the outer edges of the closure member to provide a spaced end flange portion 18 which extends over the margins of the top end member to seal it in position.

The bent or folded parts 16, 18 of the body adjacent its end together with the marginal edges of the top end member 12 are permanently secured together by interposing a suitable liquid-proof adhesive between the parts. This manner of construction provides a liquid-tight end seam joint indicated by the numeral 19.

The top end member 12 of the preferred embodiment is provided with a filling opening 22 and a dispensing opening 23 (Figs. 2 and 3) which openings are formed adjacent diametrically opposed corners. These openings are closed by individual hinge plug closure elements 24 and 25 illustrated as integrally formed and connected together at an intermediate portion 26. Each of the hinge plug closure elements includes a slightly tapered plug section 27 and 28 respectively.

The hinge plug closure elements are secured to the top end member 12 at its intermediate portion 26 by means of a wire staple 29 which is arranged to permit either or both of the plug closure elements to swing independently into an open or into a closed position. This permits a separate and subsequent operation of filling and closing of the filling opening and dispensing of the container contents through the opened dispensing opening.

As in the Hothersall patented container previously referred to, the instant container also is closed temporarily by the plug section 27 of the hinge plug closure 24 being inserted into the filling opening 22 while the container is empty. The dispensing opening 23 likewise is closed by the cup shape plug section 28 of the hinge plug closure 25 being inserted therein during the manufacture of the container.

These operations are performed in the container manufacturer's plant so that the dispensing opening may be hermetically sealed while all of the container parts are in a sterile condition before being shipped to a dairy or packer's plant. This protects the region of the top end surrounding the dispensing opening and the end seam edge at the corner of the container over which the container contents ultimately will be poured.

The final sealing of the dispensing opening includes altering the shape of the drawn plug 28 of the hinge closure 25 by a suitable expanding tool to form a circumferential bead 32. The outer marginal edge portion of the hinge plug closure 25 lies flat upon the flush surface of the end member and overlaps upon the body edge portion 18 where it is secured in place in a tamper-proof seal. This additional seal comprises a right angled band or strip 33 made of light gauge metal. Such a band preferably is of U-shape cross-section and is arranged to embrace the front end portion of the hinge closure member and to extend beneath the end seam joint 19 of the container. This additional sealing is preferably performed in the container manufacturer's plant.

After the container is filled in the dairy the filling opening is closed by the closure plug 27 and here again a better seal is formed by altering the plug slightly. Accordingly the plug 27 is beaded as at 34 (Fig. 3), this being performed in the dairy.

When the container is to be opened for dispensing purposes, the metal band 33 is removed from the corner of the container and the hinge plug closure 25 is lifted from the dispensing opening, as best illustrated in Fig. 3 of the drawings. This uncovers the opening and exposes the formerly concealed and protected sterile region surrounding the opening, whereupon the contents of the container may then be dispensed over the flush top surface of the container in this region without fear of tainting the contents.

A flat top container having individual openings for filling and for dispensing may be protected in slightly different ways. One such modification is shown in Figs. 4 and 5 of the drawings and this utilizes an overcap or protective cover. For this purpose a transparent protective overcap 41 formed from "Cellophane" or "Glassine" or similar fibrous material may be temporarily sealed over substantially half of the top end of a filled and sealed container. Such an overcap is substantially of triangular configuration with two adjacent marginal edges being folded over the end seam joint 19 of the container.

The diagonal or hypotenuse marginal edge of the overcap 41 is adhesively and hermetically secured to the upper surface of the end seam 18 and to the top end 42 of the container. Such a top end may be substantially flat as shown in Fig. 5, spaced slightly beneath the upper edge portion of the flange 18, in which case filler pieces 43 are or may be interposed between the overcap and the top end member (Figs. 4 and 6).

The top end 42 may also be formed with a flush top such as contemplated in the top end member 12 in Figs. 1, 2 and 3 of the drawings, or a substantially flat end as illustrated in Fig. 4, which may be embossed in this region to provide a flush area or surface upon which the overcap 41 may be sealed. When the overcap 41 is used, the sealing band 33 may be dispensed with. The closure plugs for closing the filling and dispensing openings in connection with this container, as well as other parts of the container, are of substantially the same configuration and structural character as illustrated and described in connection with the preferred embodiment of the invention.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A container for liquids, comprising a tubular body having a flat top end member secured to an end thereof in a leak-proof end seam joint, said top end member having spaced filling and dispensing openings therein, a double plug closure element hingedly secured at its intermediate part to said top end member respectively for closing and sealing said filling and dispensing openings, said dispensing opening plug closure having an outer marginal portion extending over and secured to the upper surface of said end seam joint, and securing means engaging over said marginal plug portion and extending beneath said end seam, whereby the container may be opened by removing said securing means and hinging outwardly said dispensing opening plug closure to expose a sterile surface area surrounding the dispensing opening over which the container contents may be poured free of contamination by contact with said surface area.

2. A container for liquids comprising a tubular fibre body of substantially square cross section having its upper end walls folded inwardly over and secured to the marginal portions of a substantially flat top fibre end member in a leak-proof end seam joint, said end member having spaced filling and dispensing openings arranged adjacent diagonally opposed corner portions thereof, a fibre double plug closure element hingedly secured intermediate its ends to said top end member, said closure element having a pair of integral drawn plug sections, one of said plugs being adapted to fit into and close said dispensing opening and to cover a sterile surface of said end member adjacent said opening, the other of said plug sections being adapted to close said filling opening, and a metal band of U-shaped cross section for embracing said end joint and the outer protective marginal portions of said closure element adjacent said dispensing opening in a tamper-proof seal, whereby the container may be opened by removing said metal band and hinging outwardly a portion of said closure element to expose said sterile surface and said dispensing opening for pouring the container contents over said sterile surface free of contamination by contact therewith.

3. A container for liquids comprising a rectangular tubular fibre body of substantially square cross section having its upper end walls folded inwardly over and adhesively secured to the marginal portion of a substantially flat top fibre end member in a leak-proof end seam joint, said end member having spaced filling and dispensing openings arranged adjacent diagonally opposed corner portions thereof, a double plug closure element hingedly secured at its intermediate portion to said end member, said closure element including a pair of integral spaced drawn plug sections, one of said plugs being adapted to close and seal said dispensing opening and the other plug section being adapted to close and seal said filling opening, said top end member having a diagonal surface area disposed adjacent the dispensing opening closed by said first mentioned plug section, and a protective overcap secured over said diagonal surface area and said first mentioned plug section to protect said sealed dispensing opening and to maintain the adjacent top end surface beneath the overcap in a sterile condition, whereby the container may be opened by removing said protective overcap and hinging outwardly said plug section from the dispensing opening for pouring the container contents over said sterile surface free of contamination by contact therewith.

CARL G. PREIS.